Figure 1:
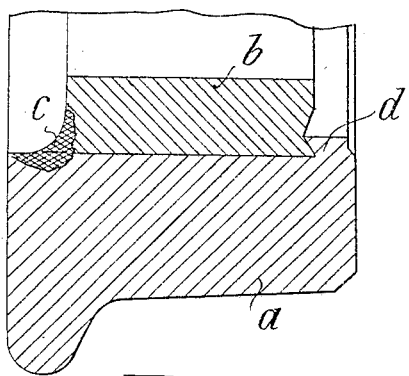

No. 787,801. PATENTED APR. 18, 1905.
T. STAPF.
METHOD OF FASTENING WHEEL TIRES TO THE WHEEL BODIES IN WHEELS FOR RAILWAY VEHICLES.
APPLICATION FILED SEPT. 28, 1904.

Witnesses:

Inventor
Thomas Stapf
By James L. Norris
Atty.

No. 787,801.

Patented April 18, 1905.

UNITED STATES PATENT OFFICE.

THOMAS STAPF, OF FERNITZ, AUSTRIA-HUNGARY.

METHOD OF FASTENING WHEEL-TIRES TO THE WHEEL-BODIES IN WHEELS FOR RAILWAY-VEHICLES.

SPECIFICATION forming part of Letters Patent No. 787,801, dated April 18, 1905.

Application filed September 28, 1904. Serial No. 226,393.

*To all whom it may concern:*

Be it known that I, THOMAS STAPF, a subject of the Emperor of Austria-Hungary, residing at Fernitz, Lower Austria, Empire of Austria-Hungary, have invented certain new and useful Improvements in Methods of Fastening Wheel-Tires to the Wheel-Bodies in Wheels for Railway-Vehicles, of which the following is a specification.

The methods hitherto proposed or actually employed for the purpose of fastening the wheel-tire on the wheel-body of wheels for railway-vehicles are complicated and tedious and do not afford any guarantee of a completely-intimate and permanently-firm connection between the wheel-tire and the wheel-body because it has been found by experience that the wheel-tire is very liable in course of time to become loosened, shifted, or twisted relatively to the wheel-body, and moreover not unfrequently breakages of wheel-tires occur which have originated at the very place or places of fastening. For instance, the wedge-like action of the retaining-rings which are mostly employed at present for fastening and the weakening of the cross-sectional area of the wheel-tire in consequence of the notching or grooving necessitated by the retaining-ring render even the best of the existing methods of fastening faulty.

Now this invention has for its object a method of effecting an efficient and permanently-secure connection between the wheel-tire and the wheel-body which avoids all the drawbacks of the methods of fastening hitherto employed.

This improved method consists, substantially, in fastening the wheel-body on the wheel-tire (which is preferably shrunk upon the wheel-body, as hitherto) by welding masses of iron, steel, or other metal in the suitably-shaped annular recess, groove, or channel formed by the angle or along the place where the surface of the wheel-body meets the surface of the wheel-tire. The said masses of metal are welded onto both parts of the wheel in such a manner as to connect the two parts directly together. The welding may be effected by means of the electric arc or by means of very hot products of combustion, such as are produced by the combustion of water-gas, oxyhydrogen gas, and the like, or by means of the Goldschmidt alumino-thermic process. This welding may be done on one side only of the wheel or on both sides thereof and either along the entire periphery of the place of contact or only at certain points of the same, and it may extend to a greater or less depth below the surface. By this welding, which may be effected with advantage by means of electricity, there is produced an absolutely firm and intimate connection between the wheel-tire and the wheel-body. The weld may afterward be hammered over according to requirements and finally cut into any desired shape.

The accompanying drawings illustrate some of the many possible forms of fastening carried out in accordance with this improved method.

Figure 1 illustrates a fastening in which the wheel-tire *a* and the wheel-body *b* are connected together on one side only of the wheel by means of the metal body *c*, welded thereon, the hitherto usual dimensions as to width being retained, while on the other side of the wheel the connection is effected by means of the usual dovetail-shaped shoulder *d*, which engages over the wheel-body.

Figure 2:
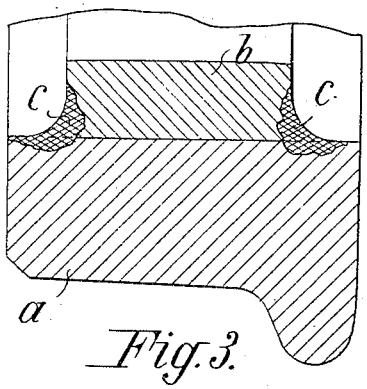

In Fig. 2 the wheel-body *b* is connected on both sides at the junction-lines of its surface with the surface of the wheel-tire *a* by means of the metal bodies *c*, welded thereon.

Figure 3:
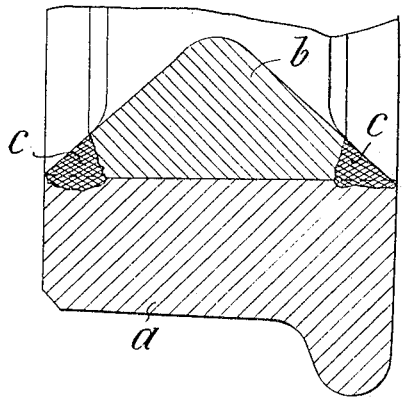

Fig. 3 illustrates the same method of fastening in the case of a wheel for locomotive-engines. In this case also the proportions as to width of the wheel-tire and wheel-body are the same as those at present in general use.

This method affords the following further advantages: The cross-section of the wheel-tire is not weakened in any way, and in case of fracture of the wheel-tire the pieces are held fast at every place of the periphery in a much better way than in the case of the methods of fastening hitherto employed. Defects in the wheel-tire, as also shifting of the same on the wheel-body along the axle of the vehicle, are excluded. The rim or felly of the wheel—that is to say, the wheel-body—may be made wider than hitherto, whereby the strength of the wheel is very considerably increased. Further, the preparatory work on the wheel-tire and the wheel-rim which is necessitated by the usual method of fastening is greatly simplified and cheapened, and worn wheel-tires can be removed from the wheel-bodies in a much more simple way than hitherto—namely, by cutting away the welding metal in a lathe.

The improved method is also adapted for strengthening the existing methods of fastening in which rivets, bolts, and screws are employed.

What I claim is—

1. A method of fastening wheel-tires to wheel-bodies which consists in bringing a mass of metal in the angle formed by the wheel-body and the wheel-tire and welding the mass of metal to the wheel-body and the wheel-tire.

2. A method of fastening wheel-tires to wheel-bodies which consists in bringing masses of metal in both angles formed by the wheel-body and the wheel-tire on both sides of the wheel and welding each mass of metal to the wheel-body and the wheel-tire.

3. A method of fastening wheel-tires to wheel-bodies which consists in bringing masses of metal in the angle formed by the wheel-body and the wheel-tire only at single places of the periphery and welding the masses of metal to the wheel-body and the wheel-tire.

4. A method of fastening wheel-tires to wheel-bodies which consists in bringing masses of metal in both angles formed by the wheel-body and the wheel-tire on both sides of the wheel only at single places of the periphery and welding the masses of metal to the wheel-body and the wheel-tire.

In testimony whereof I have hereunto set my hand in presence of two subscribing witnesses.

THOMAS STAPF.

Witnesses:
GUSTAV PHILIPPITCH,
ALVESTO S. HOGUE.